United States Patent [19]
Baney et al.

[11] Patent Number: 5,991,476
[45] Date of Patent: Nov. 23, 1999

[54] PUMP DIRECTED OPTICAL SWITCHING ELEMENT

[75] Inventors: Douglas M. Baney, Los Altos; Steven A. Newton, Belmont; Wayne V. Sorin, Mountain View, all of Calif.

[73] Assignee: Hewlett-Packard Company, Palo Alto, Calif.

[21] Appl. No.: 09/076,692

[22] Filed: May 12, 1998

[51] Int. Cl.$^6$ .................................................... G02B 6/26
[52] U.S. Cl. ............................................. 385/16; 359/573
[58] Field of Search ................................. 385/16–23, 10, 385/8, 24, 37, 31, 39, 129–131, 901; 359/283, 251, 252, 573; 372/102, 6; 356/73.1, 224

[56] References Cited

U.S. PATENT DOCUMENTS

| | | | |
|---|---|---|---|
| 5,491,548 | 2/1996 | Bell et al. ............................... | 356/73.1 |
| 5,504,772 | 4/1996 | Decon et al. ........................... | 372/102 |
| 5,544,268 | 8/1996 | Bischel et al. ............................. | 385/4 |
| 5,583,957 | 12/1996 | Blow ........................................ | 385/21 |
| 5,655,036 | 8/1997 | Webb ....................................... | 385/15 |
| 5,703,710 | 12/1997 | Brinkman e tal. ...................... | 359/283 |
| 5,911,018 | 6/1999 | Bischel et al. ............................ | 385/16 |

OTHER PUBLICATIONS

Clos, Charles, "A Study of Non–Blocking Switching Networks," *Bell Systems Technical Journal,* Mar. 1953, pp. 406–424.

C.R., "Light Applications of Fiber Bragg Gratings," *Journal of Lightwave Technology,* vol. 15, No. 8, Aug. 1997, pp. 1391–1404.

*Primary Examiner*—Akm E. Ullah

[57] ABSTRACT

An optical switch includes a pump source, a pump director, and a pump-dependent attenuator. The pump-dependent attenuator passes optical signals when it is supplied with pump energy at a pumping wavelength and attenuates optical signals when it is not supplied with pump energy. The pump source generates pump energy for the pump-dependent attenuator, and the pump director optically manipulates the delivery of pump energy to the pump-dependent attenuator. In a preferred embodiment, the pump-dependent attenuator is an erbium-doped fiber (EDF), the pump source is a laser diode, and the pump director is a tunable fiber Bragg grating (FBG). The EDF is located along an optical signal transmission path between an input waveguide and an output waveguide. The tunable FBG is located along a transmission path between the laser diode and the EDF. To operate the switch, pump energy at a pumping wavelength is generated by the laser diode and transmitted toward the tunable FBG. To turn on the switch, the FBG is tuned off of the pumping wavelength of the EDF, thereby passing pump energy to the EDF, and to turn off the switch, the FBG is tuned onto the pumping wavelength of the EDF, thereby blocking pump energy to the EDF. An adjustable bandpass filter may also be used as the pump director. The optical switch can also be applied to various optical systems, such as a 1×N switch, add/drop multiplexers, broadcast/multicast switches, and wavelength-selectable lasers.

20 Claims, 8 Drawing Sheets

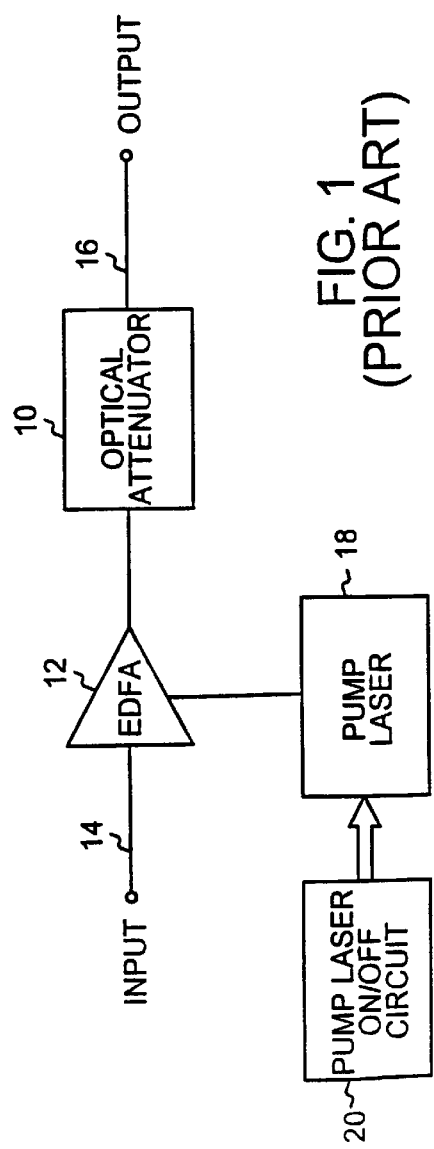
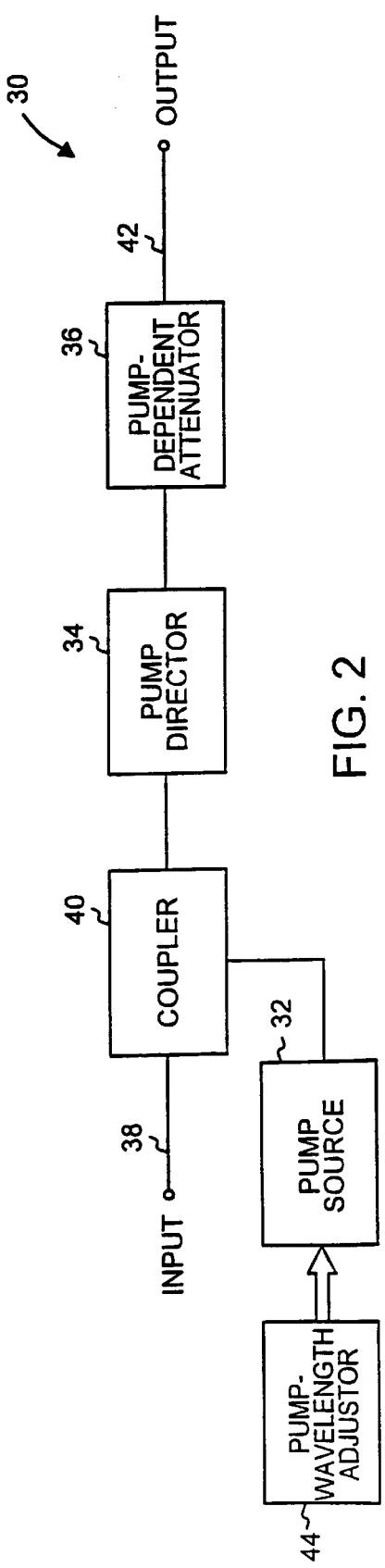
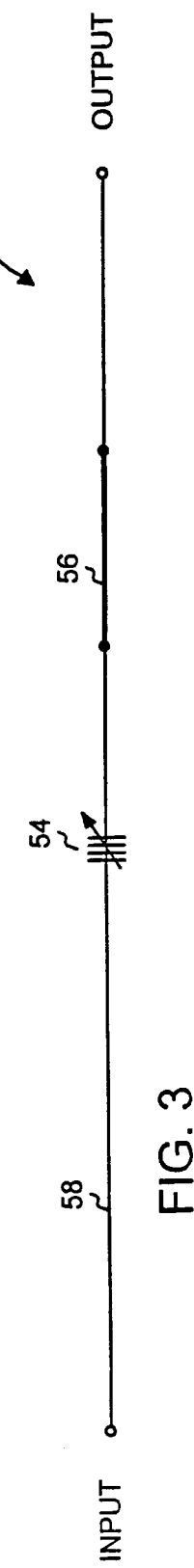

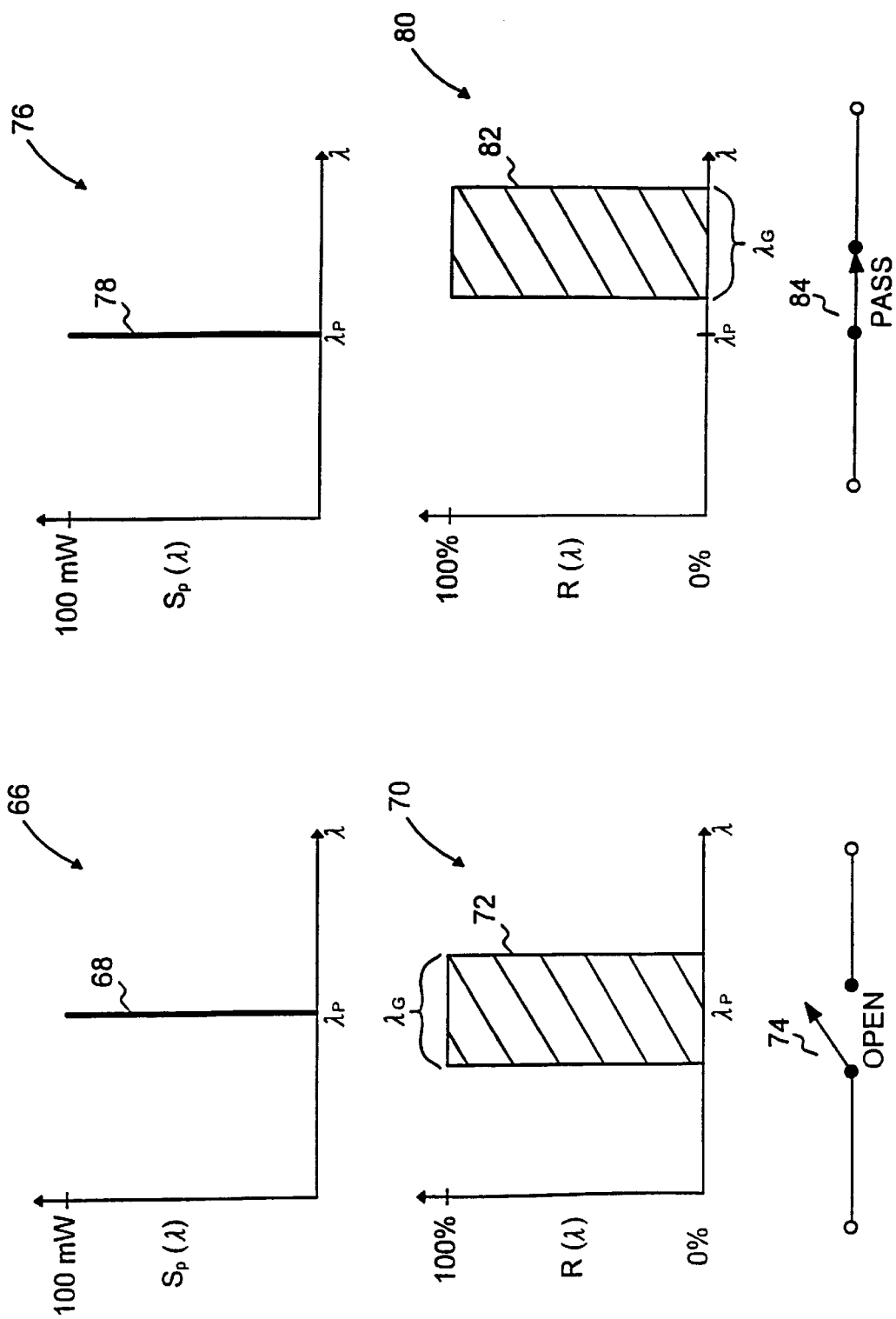

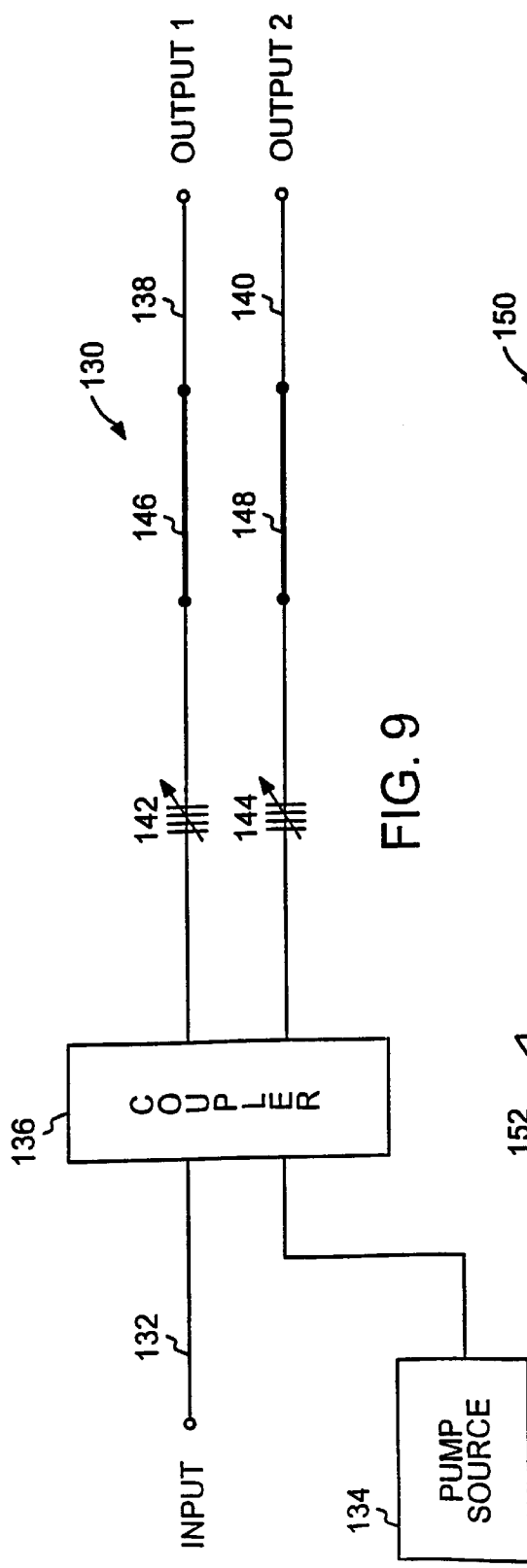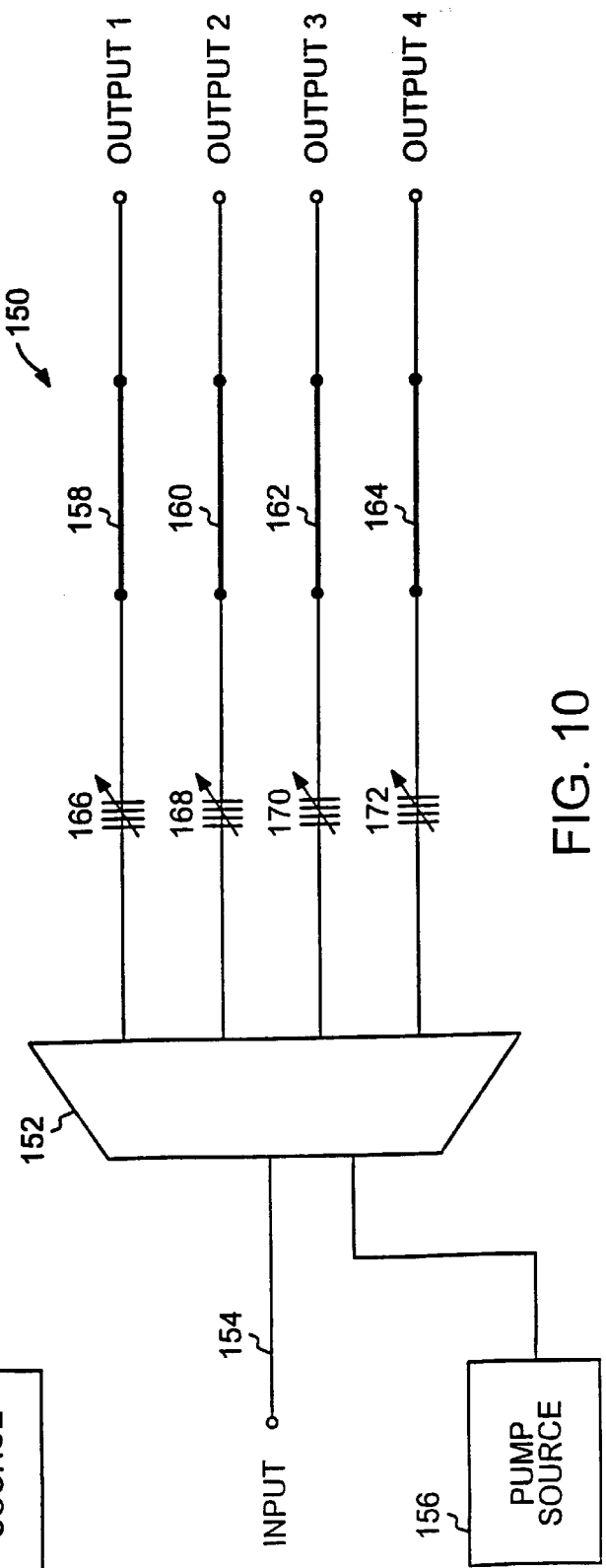

PUMP DIRECTED OPTICAL SWITCHING ELEMENT

TECHNICAL FIELD

The invention relates generally to lightwave communications systems and more particularly to optical switches in lightwave communications systems.

BACKGROUND ART

Lightwave networks are increasingly being used to transfer information around the world. Lightwave networks include a number of stations, or nodes, that are interconnected by stretches of waveguides, typically optical fibers. Inside an optical fiber, pulses of light are transferred over long distances. In order to maintain the power of optical signals as they propagate through long stretches of optical fiber and/or other hardware devices, optical amplifiers are added in various locations in an optical network to maintain the energy level required for reliable optical communication.

In optical communications systems, a common optical amplifier is an erbium-doped fiber amplifier (EDFA). An EDFA is a segment of optical fiber integrated into the optical path to transfer optical energy to a passing signal when the EDFA is contacted by a pump source, which is typically a 980 nanometer or a 1480 nanometer laser pump source. The laser pump excites the EDFA, which in turn transfers optical energy to the passing signal, creating an amplified signal or, at a minimum, passing the sign attenuation. When pump energy is not applied to an EDFA, the EDFA may attenuate a passing optical signal by as much as 50 dB. The term pump energy used in conjunction with an EDFA or erbium-doped fiber (EDF) refers to the power associated with the pump wavelength of the EDFA or EDF.

Optical switches have been developed that incorporate the amplifying characteristics of EDFAs. FIG. 1 illustrates an optical switch utilizing an EDFA, as disclosed in U.S. Pat. No. 5,655,036, entitled "Branching Unit for Telecommunications Optical Cable Systems," issued to Webb. An optical attenuator 10 is combined with an EDFA 12 along an optical path to function as a switch to selectively prevent optical signals from propagating from an input fiber 14 to an output fiber 16. In order to allow optical signals to pass from the input fiber to the output fiber of the switch, the EDFA is powered by a laser pump 18. That is, the optical switch is controlled by turning the laser pump on and off, as needed. The laser pump is electronically turned on and/or off by a pump laser on/off circuit 20.

A disadvantage of the Webb system is the requirement of direct control of the pump laser output power to effectuate a switching event in a single switch. In addition, an optical switch requiring pump output power control has limited scalability. Both limitations may cause problems when rapid on/off switching is needed.

In addition to optical amplifiers, other optical devices such as wavelength stabilized lasers, wavelength division multiplexers, demultiplexers, and gain equalizers are used in lightwave communications systems. In many of the devices, fiber Bragg gratings (FBG) are used to reflect narrow bands of light energy in order to achieve a desired result. An FBG reliably reflects light energy by means of periodic changes or perturbations along the core of an optical waveguide. The perturbations create changes in the refractive index of the core of the waveguide. At each change, a portion of the optical energy is reflected, inducing interference in a constructive manner. The degree of change in refractive index along the core of an optical fiber, the grating period, and length of the FBG are factors that determine the range of wavelengths that will be reflected, as well as the efficiency of reflection.

FBGs are effective devices for filtering narrow wavelength bands of light energy in optical fibers. In addition, an FBG can be easily adjusted or tuned, in place, to cause the FBG to reflect a different wavelength. Tuning of an FBG's wavelength band of reflectivity typically involves thermally or mechanically changing the periodicity of the periodic perturbations of the FBG.

In contrast to FBGs, bandpass filters such as Fabry-Perot filters are used in optical fibers to reliably reflect a wide wavelength band of optical energy, while allowing a narrow wavelength band of optical energy to pass. Bandpass filters are also adjustable with respect to the passing wavelength band.

As lightwave network technology continues to develop, more advanced optical switches are needed to create new and improved optical devices. The narrow wavelength band filtering properties of FBGs may be utilized to create the advanced optical switches. Although the switch disclosed by Webb works well for its intended purpose, in order to create new and improved optical devices, what is needed is an optical switch that does not require direct control over pump laser output power. In addition what is needed is an optical switch that can be scaled up to create useful optical devices.

SUMMARY OF THE INVENTION

The invention is a method and system for controlling an optical switch by optically manipulating the delivery of pump energy to a pump-dependent attenuator. The elements of the optical switch include a pump source, a pump director, and the pump-dependent attenuator. The pump-dependent attenuator passes optical signals, and possibly amplifies optical signals, when it is supplied with pump energy and attenuates optical signals when it is not supplied with pump energy. The pump source generates energy for the pump-dependent attenuator and the pump director optically manipulates the delivery of the pump energy to the pump-dependent attenuator. The pump-dependent attenuator is located along an optical signal transmission path between an input waveguide and an output waveguide. The pump director is located along a transmission path between the pump source and the pump-dependent attenuator. To operate the switch, pump energy is generated by the pump source and transmitted toward the pump director. The pump director either allows the pump energy to be supplied to the pump-dependent attenuator or blocks the transmission of the pump energy before it is supplied to the pump-dependent attenuator.

Preferably, the delivery of pump energy to the pump-dependent attenuator is manipulated by either changing the wavelength of the pump energy that is generated or by changing an optical transmission characteristic of the pump director. In a preferred embodiment, the pump-dependent attenuator is an erbium-doped fiber (EDF) that passes or amplifies optical signals when supplied with pump energy at a pumping wavelength. The pump source is a laser diode that generates pump energy fixed at the pumping wavelength, and the pump director is a tunable fiber Bragg grating (FBG), which is a narrow band reflector that can be adjusted to either reflect pump energy at the pumping wavelength or to allow pump energy at the pumping wavelength to be supplied to the EDF. To turn on, or close, the switch, the FBG is tuned from the pumping wavelength, thereby passing pump energy to the EDF, and to turn off, or open, the switch, the FBG is tuned onto the pumping wavelength, thereby blocking pump energy to the EDF.

In a modification of the preferred embodiment, the laser diode is adjustable such that it can generate pump energy at the pumping wavelength or a wavelength that is blocked by an FBG that is fixed with respect to its wavelength band of reflectivity. To turn on, or close, the switch, the laser diode is adjusted to generate pump energy at the pumping wavelength and to turn off, or open, the switch, the laser diode is adjusted to generate energy at the wavelength that is blocked by the FBG.

In another alternative embodiment, instead of using an FBG as the pump director, a bandpass filter can be used as the pump director. In contrast to the FBG, which is tuned to block a narrow wavelength band of energy, the bandpass filter passes a narrow band of pump energy and as a result, the filter is selectively adjusted to either allow pump energy to propagate to the EDF or to block the pump energy from reaching the EDF.

The method and system for controlling an optical switch can also be applied to various optical systems. For example, a 1×2 switch is formed by connecting an input fiber and a pump source to the input side of a coupler and connecting two output fibers with respective pump directors and pump-dependent attenuators to the output side of the coupler. To switch transmission of an optical switch between the two output fibers, the pump directors are adjusted to optically control the supply of pump energy to the pump-dependent attenuators. The method and system are also applied to other optical systems, such as 1×N switches, add/drop multiplexers, broadcast/multicast switches, and wavelength selectable lasers.

Advantages of the invention are that a pump source is continuously generating pump energy so that time is not wasted turning on and warming up the pump source before each switch event. Since the pump source is continuously generating pump energy, the pump source can be more readily stabilized to generate the desired wavelength of pump energy. Additionally, in configurations using many of the switches, the pump directors allow the control of different switches without modifying the output characteristic of the pump source. The switch also allows the lossless switching, or even amplification, of the switched signals.

BRIEF DESCRIPTION OF THE DRAWINGS

FIG. 1 is a depiction of an optical switch utilizing a pump laser control circuit and an EDF/optical attenuator combination in accordance with the prior art.

FIG. 2 is a depiction of an optical switching cell utilizing an optical pump director in accordance with the invention.

FIG. 3 is a depiction of a preferred optical switching cell utilizing an FBG and an EDF in accordance with the invention.

FIG. 4 is a graph of optical energy generated and reflected as a function of wavelength for the switch of FIG. 3 with an adjustable FBG tuned such that the switch circuit is in an open condition.

FIG. 5 is a graph of optical energy generated and reflected as a function of wavelength for the switch of FIG. 3 with an adjustable FBG tuned such that the switch circuit is in a closed condition.

FIG. 9 is a depiction of a 1×2 switch utilizing two optical switch devices in accordance with the invention.

FIG. 10 is a depiction of a 1×4 switch utilizing four optical switch devices in accordance with the invention.

DETAILED DESCRIPTION

Figure 7:
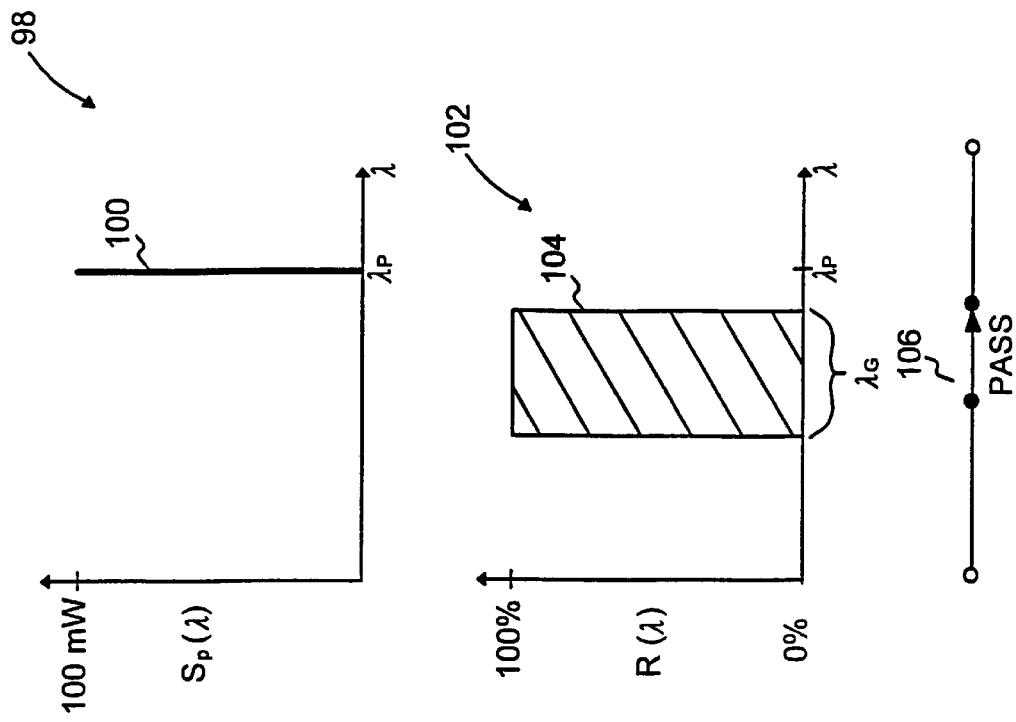
FIG. 7 is a graph of optical energy generated and reflected as a function of wavelength for the switch of FIG. 2 with an adjustable pump source generating pump energy such that the switch circuit is in a closed condition.

FIG. 2 is a diagram of a basic switching device in accordance with the present invention. The key elements of the switch 30 include a pump source 32, a pump director 34, and a pump-dependent attenuator 36.

The pump source is optically connected to an input waveguide 38, such as a single mode optical fiber, by an optical coupler 40. The pump source is preferably a laser diode emitting 980 nm or 1480 nm laser light. An exemplary laser diode is an InGaAsP laser diode. In one embodiment of the switch, the laser wavelength is fixed. For example, the laser may emit a continuous beam of optical energy, or pump energy, fixed at 1480 nm, where pump energy refers to the power associated with the pump wavelength. In another embodiment of the switch, the laser wavelength is adjustable, via a pump-wavelength adjustor 44. For example, the laser may emit optical energy at 1490 nm and then the laser may be adjusted to emit optical energy at 1480 nm. The pump-wavelength adjustor may include electrical and/or optical components, although that is not critical to the invention.

In addition to or as an alternative to supplying pump optical energy to the switch 30 through a conventional optical coupler 40, pump optical energy may be introduced upstream in the input waveguide 38, or the pump energy may be introduced through the cladding layer of the input optical fiber, directly to the pump director 34, or to the pump-dependent attenuator 36.

The pump director 34 is a device that can control the propagation of optical energy through a waveguide. In a preferred embodiment, the pump director is an optical reflector, such as an FBG. As described, an FBG can reflect a desired wavelength band of optical energy, in effect blocking optical energy with a target wavelength from propagating beyond the FBG. Depending upon whether the pump source 32 is adjustable, the FBG can be fixed or adjustable with respect to its wavelength band of reflectivity. A fixed FBG reflects optical energy of a fixed wavelength band and an adjustable FBG can be thermally or mechanically influenced to allow the FBG to change the wavelength band of optical energy that is reflected. FBGs are typically temperature adjustable over a wavelength range of 0.8 nm.

Another example of a pump director 34 that can be utilized in the switch 30 is a bandpass filter in combination with WDMs for a signal/pump energy separation. A bandpass filter, such as a Fabry-Perot filter, allows only a narrow wavelength band of optical energy to pass while the majority of the optical energy is lost. A bandpass filter can be adjustable such that the wavelength band that is passed is shifted.

The pump-dependent attenuator 36 is a device that can either attenuate optical energy or pass optical energy with minimal attenuation, depending on whether or not the device is supplied with the proper pump optical energy. The attenuator is typically connected to the pump director 34 and to an output waveguide 42. In a preferred embodiment, the pump-dependent attenuator is an erbium-doped fiber (EDF) which is connected in an optical path between the pump director and the output fiber. An EDF is used as the pump-dependent attenuator because an EDF attenuates an optical signal propagating into the EDF when no pump energy at a pumping wavelength is supplied to the EDF and because the EDF amplifies, or passes with minimal attenuation, an optical signal propagating into the EDF when pump energy at a pumping wavelength is supplied. In the preferred embodiment, the pumping wavelength of the EDF is around either 980 nm or 1480 nm. The physical dimensions and erbium doping concentration of the EDF are factors that affect its attenuating and amplifying characteristics.

Operation of the basic switching device is described with reference to FIGS. 3–5. FIG. 3 is a depiction of a preferred embodiment of the basic switching cell. The switch 50 utilizes a laser diode (not shown) as the pump source, an FBG 54 as the pump director, and an EDF 56 as the pump-dependent attenuator. In this embodiment of the switch, the laser diode generates pump energy that is input into the input waveguide 58 well upstream of the switch. The pump energy is fixed with respect to the center wavelength ($\lambda_P$) of emitted optical energy, and the FBG is a tunable FBG that is adjustable with respect to the wavelength band ($\lambda_G$) of reflectivity.

FIG. 4 includes two related graphs of optical energy generated and reflected as a function of wavelength and a depiction of the resulting open circuit. The bar 68 in the upper graph 66 represents the intensity as a function of wavelength ($S_P(\lambda)$) of the optical energy generated by the laser diode. For example purposes, it is assumed that pump optical energy is generated at the fixed center wavelength of 1480 nm, which is the pumping wavelength of the EDF 56, and the intensity of the optical energy is 100 mW. The bar 72 in the lower graph 70 represents the wavelength band of reflectivity of the FBG 54. As depicted in FIG. 4, the wavelength band of reflectivity ($\lambda_G$) includes the center wavelength ($\lambda_P$) of the pump source and as a result the FBG reflects nearly 100% of the pump optical energy that is centered at $\lambda_P$. Since the FBG reflects all of the pump optical energy that propagates from the laser diode to the FBG, no pump optical energy at the pumping wavelength of 1480 nm is supplied to the EDF 56. Therefore, the EDF attenuates optical signals that propagate to the EDF region. Assuming the EDF has a sufficiently high attenuation to overcome the strength of the optical signals entering the EDF, the EDF in effect blocks the optical signals from passing to the output fiber and as a result the switch circuit 74 is in an "open" condition. In an open condition, no optical signals within the wavelength band of concern pass the EDF. An open condition is synonymous with an "off" condition.

FIG. 5 includes two related graphs of optical energy generated and reflected as a function of wavelength, as well as a depiction of the resulting closed circuit. Again, the bar 78 in the upper graph 76 represents the intensity as a function of wavelength ($S_P(\lambda)$) of the optical energy generated by the laser diode. The bar 82 in the lower graph 80 represents an adjusted wavelength band ($\lambda_G$) of reflectivity of the FBG 54. As adjusted, the wavelength band of reflectivity does not include the center wavelength ($\lambda_P$) of the pump source and as a result the FBG does not reflect any of the pump optical energy. Therefore, pump optical energy at the pumping wavelength is supplied to the EDF 56, causing the EDF to amplify, or pass with minimal attenuation, any optical signal that propagates to the EDF. With pump optical energy supplied to the EDF, the switch circuit 84 is in a "pass" condition, allowing optical signals to pass through the output waveguide. The pass condition is synonymous with an "on" or "closed" condition. By controlling the wavelength band of reflectivity of the tunable FBG, an efficient and reliable optical switch with on/off capability is created.

Figure 6:
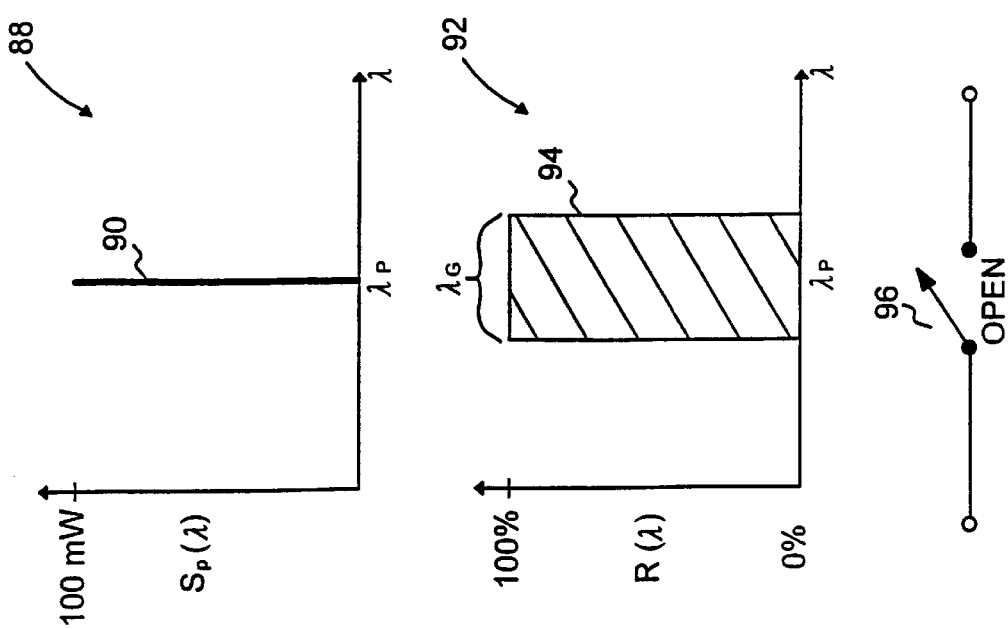
FIG. 6 is a graph of optical energy generated and reflected as a function of wavelength for the switch of FIG. 2 with an adjustable pump source generating pump energy such that the switch circuit is in an open condition.

In another embodiment of the switch 50 of FIG. 3, the laser diode is adjustable, via a pump-wavelength adjustor (not shown), with respect to the wavelength band of optical energy that is emitted and the FBG 54 is not adjustable with respect to its wavelength band of reflectivity. FIGS. 6 and 7 are similar to FIGS. 4 and 5, except that the laser diode is adjusted instead of the FBG. Referring to FIG. 6, in the upper graph 88 pump energy 90 is generated at a center wavelength ($\lambda_P$) of, for example, 1470 nm and in the lower graph 92 the FBG has a fixed wavelength band ($\lambda_G$) of reflectivity 94 that is centered at 1470 nm. Since the center wavelength of the pump energy is within the wavelength band of reflectivity of the FBG, the pump optical energy is reflected by the FBG, preventing the pump optical energy from being supplied to the EDF, thereby creating an open, or off, condition in the switch circuit 96.

Referring to FIG. 7, in the upper graph 98 the laser diode is adjusted such that the pump energy 100 is generated at a center wavelength of 1480 nm instead of 1470 nm. Referring to the lower graph 102, since the pump energy has been adjusted to be outside the fixed wavelength band of reflectivity 104 of the FBG 54, the EDF 56 is supplied with pump optical energy at the pumping wavelength and a pass, or on, condition is generated in the switch circuit 106. As can be seen from FIG. 2 and the two embodiments described with reference to FIGS. 3–7, a pump-energy controller, either the pump director or the pump-wavelength adjustor, is utilized to influence the transmission of pump energy from the pump source to the pump-dependent attenuator.

Figure 8:
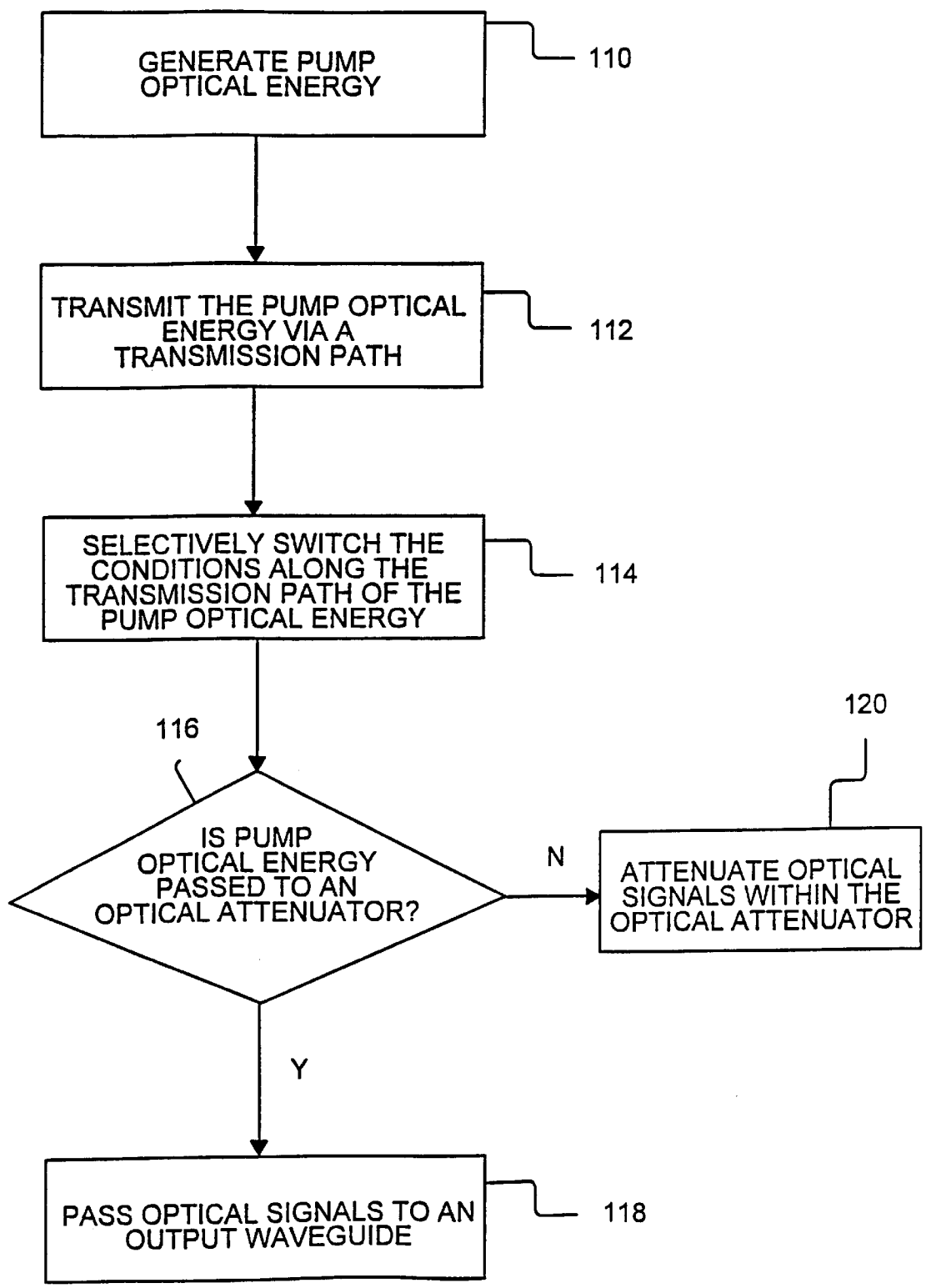
FIG. 8 is a flow diagram of a method for controlling the transmission of optical signals in accordance with the present invention.

A method for controlling the transmission of optical signals input into the optical system of FIG. 3 is described with reference to the flow diagram of FIG. 8. At step 110, pump optical energy is selectively generated at the pumping wavelength of the EDF 56. At step 112, the pump optical energy is transmitted toward the EDF via a transmission path. At step 114, the conditions along the transmission path of the pump optical energy are selectively switched between a first path condition that passes the pump optical energy to the EDF and a second path condition that blocks the transmission of pump optical energy to the EDF. At the logic point 116, if the first path condition is selected, then at step 118 an optical signal is passed to the output waveguide of the switch. If, however, the second path condition is selected, then at step 120 the optical signal is attenuated by the EDF.

An optical system incorporating the basic switching cell described above is depicted in FIG. 9. The optical system is a 1×2 switch 130 that has an input fiber 132 and a pump source 134 optically connected to an input end of an optical coupler 136 and two output fibers 138 and 140 optically connected to an output end of the optical coupler. In the preferred embodiment, each output fiber has an individually tunable FBG 142 and 144 as a pump source director and an EDF 146 and 148 as a pump-dependent attenuator. In addition, the pump source generates fixed wavelength pump energy at the pumping wavelength.

As described above for a single switch that has a fixed wavelength pump source, the FBGs 142 and 144 are individually tuned to either reflect the pump optical energy or pass the pump optical energy. In the 1×2 switch 130 configuration, there are four possible outputs of an optical signal that is input to the input fiber 132. Firstly, the FBG 142 for output fiber 1 is tuned off of the pumping wavelength, allowing the pump optical energy to contact the EDF 146, effectively turning on switch 1. Simultaneously, the FBG 144 for output fiber 2 is tuned onto the pumping wavelength, reflecting the pump optical energy away from the EDF 148, allowing the EDF 148 to attenuate the propagating signal, effectively turning output fiber switch 2 off. The result is that the signal passes through output fiber 1 only. Secondly, the tuning of the two FBGs 142 and 144 can be reversed with the resulting passage of the optical signal through output fiber 2 and not output fiber 1. Thirdly, both FBGs can be tuned onto the pumping wavelength, preventing pump optical energy from passing to either EDF 146 or 148, thereby turning both switches off, so that an optical signal does not pass from either output fiber 1 or 2. Lastly, both FBGs can be tuned off of the pumping wavelength, allowing pump optical energy to reach the two EDFs, effectively turning both switches on and allowing an optical signal to pass through both output fibers 138 and 140.

FIG. 10 is a depiction of a 1×4 switch 150 that incorporates a 1×4 coupler and four switches that are structurally equivalent to the switching cells described above. Similar to the 1×2 switch, the 1×4 switch utilizes an input fiber 154 and a pump source 156 that generates pump optical energy with a wavelength that is fixed at the pumping wavelength of the four EDFs 158, 160, 162 and 164, e.g. 980 nm or 1480 nm. The four pump source directors are tunable FBGs 166, 168, 170 and 172 that can be tuned to reflect optical energy over a range of wavelengths that includes the EDF's pumping wavelength. To control the switch, the corresponding FBGs are tuned onto or off of the pumping wavelength of the EDFs. As with the 1×2 switch, the 1×4 switch can regulate transmission of a signal between the four outputs, or the switch can transmit signals on any combination of the four output fibers.

As can be seen by an ordinarily skilled practitioner, individual switches can be applied to any number of output fibers to create a 1×N switch, where N is a positive whole number integer. To create a 1×N switch, an input fiber and pump source are connected to the input end of a 1×N coupler and N switch/output fiber combinations are connected to the output of the coupler.

Figure 11:
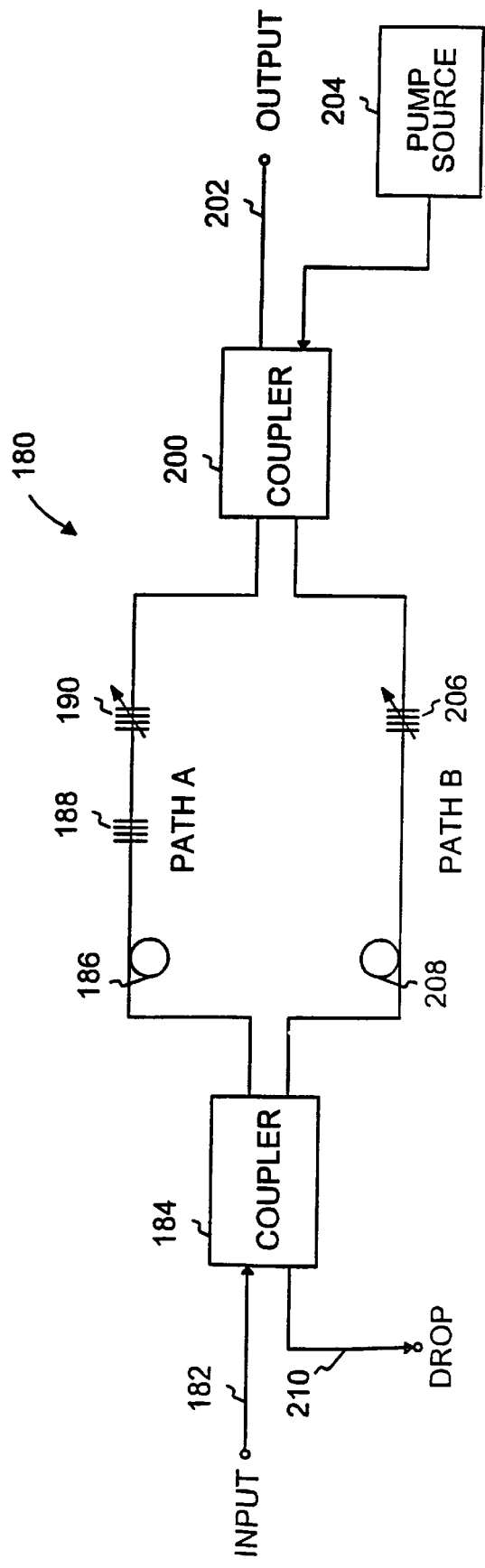
FIG. 11 is a drop multiplexer utilizing two optical switch devices in accordance with the invention.

The basic switching cell as described above can also be incorporated into optical systems such as add and drop multiplexers. FIG. 11 is a depiction of a drop multiplexer 180 that utilizes two switches to drop a channel from a WDM signal. The multiplexer has an input fiber 182 that is connected to a first coupler 184. Along the same optical path as the input fiber and immediately beyond the first coupler is an optical path, path A, that contains an EDF 186, a signal reflector 188, a pump optical energy reflector 190, and a second coupler 200. An output fiber 202 extends from the second coupler in a continuous optical path with path A. A pump source 204 is connected to the second coupler by a pump input fiber. An optical path B includes the second coupler and the first coupler and contains a pump reflector 206 and an EDF 208. Continuous with path B, a drop fiber 210 is connected to the first coupler.

In operation, a WDM optical signal is input into the system through the input fiber 182. The input signal propagates through the first coupler 184 and splits into two signals which propagate equally in path A and B. If the EDF 186 in path A is supplied with pump optical energy at a pumping wavelength, then the optical signal will propagate to the signal reflector 188 and a portion of the signal from within the reflective wavelength band of the signal reflector will be reflected back toward the first coupler and to the drop fiber 210. However, if the EDF 208 in path B is supplied with pump optical energy at a pumping wavelength, then the optical signal will pass through path B and be output on the output fiber. If one of the EDFs 186 or 208 is not supplied with pump optical energy, the un-energized EDF will attenuate the propagating signal sufficiently to terminate signal transmission in that path.

There are at least two possible approaches to controlling whether or not the EDFs 186 and 208 are supplied with pump optical energy at a pumping wavelength. The first approach involves utilizing a pump source that generates only fixed wavelength optical energy. In this approach, the pump source 204 generates pump optical energy at, for example, the pumping wavelength of 1480 nm and the pump reflectors 190 and 206, which are preferably tunable FBGs, reflect optical energy in a wavelength range that includes 1480 nm. By independently controlling the two tunable FBGs, pump optical energy at a pumping wavelength can be selectively delivered to the path A EDF or to the path B EDF. If the path A EDF is supplied with pump optical energy, then input signals will propagate to the signal FBG 188 and a desired signal will be dropped. If the path B EDF is supplied with pump optical energy, then the input signals will propagate directly to the output fiber 202 fully intact.

A second approach to operating the multiplexer 180 involves utilizing two pump reflectors 190 and 206 that have different fixed center wavelengths of reflectivity. The pump source 204 is then operated to control the wavelength of pump optical energy that is generated. To activate one of the two paths, the center wavelength of the pump optical energy is adjusted to correspond to the reflective wavelength of the pump reflector in the other path. For example, if path A is desired to be activated, then the pump optical energy is generated at the reflective wavelength of the path B reflector 206. Pump optical energy is supplied to the path A EDF 186 and reflected by the path B reflector 206 and as a result, path A is activated. The system can also be arranged and operated to perform a signal add function instead of a signal drop function.

Figure 12:
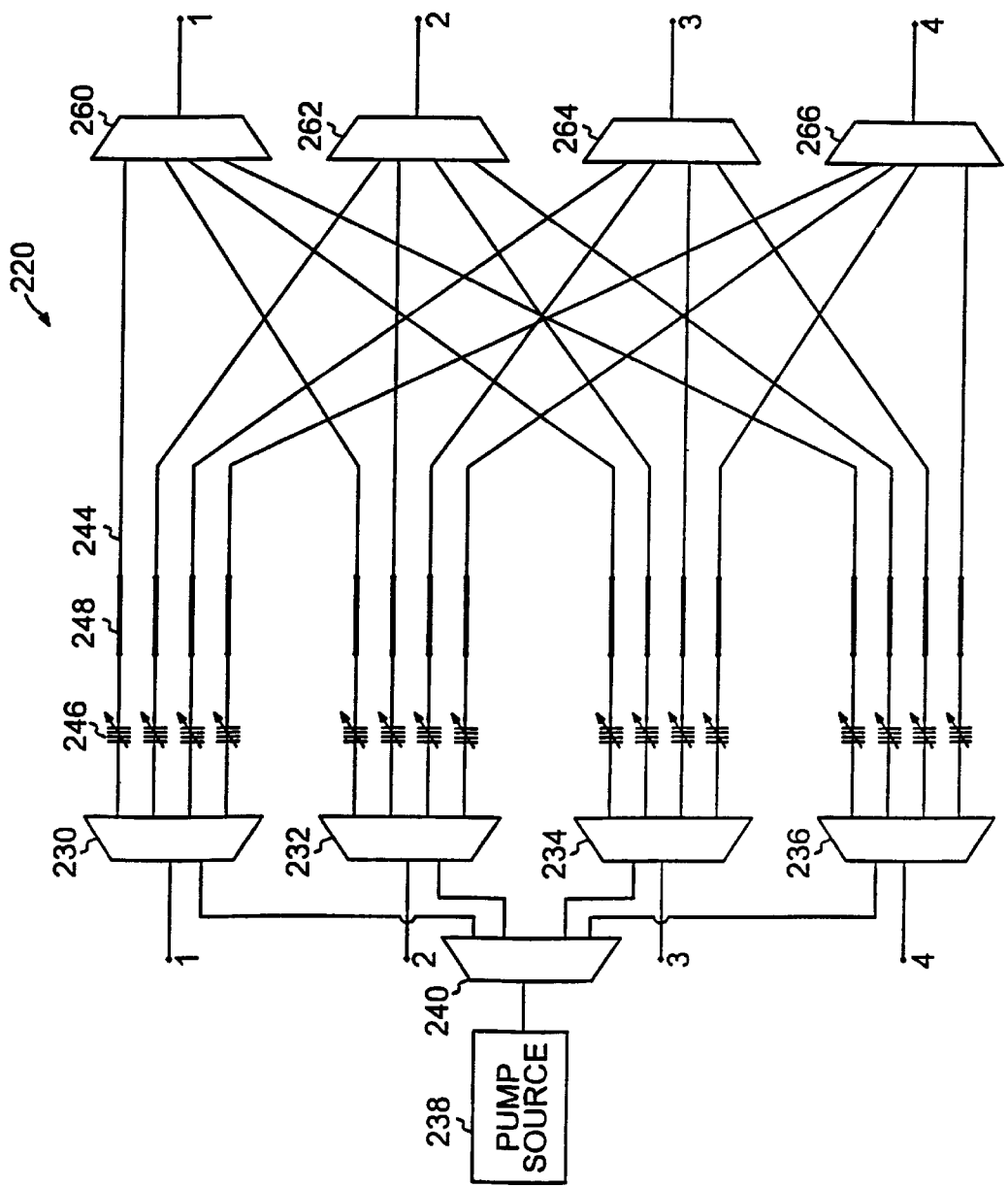
FIG. 12 is a 4×4 broadcast switch utilizing sixteen optical switch devices in accordance with the invention.

The basic switching cell can also be incorporated into optical systems such as a 4×4 broadcast switch 220. An exemplary 4×4 broadcast switch is depicted in FIG. 12. The broadcast switch has four separate input fibers, 1–4, that are individually connected to the input side of four 1×4 input couplers 230, 232, 234 and 236.

A pump source 238 is connected by a 1×4 pump coupler 240 to the input side of each of the four input couplers 230–236. Four output fibers 244, containing a tunable FBG 246 and an EDF 248, are connected to the output side of each of the four input couplers. The four output fibers on each coupler are then connected on a one-to-one basis to the input side of four 4×1 output couplers 260, 262, 264 and 266. Broadcast fibers 1–4 are connected to the output sides of each of the four output couplers. In an alternative embodiment, the single pump source 238 may be replaced by multiple pump sources, for example, one pump source dedicated to each of the four input couplers.

The broadcast switch 220 operates utilizing the same principles as the individual switch and the optical systems described above. Each output fiber 244 has an individually tunable FBG 246 as the pump reflect an EDF 248 as the pump-dependent attenuator. The pump source 238 generates pump optical energy fixed at the pumping wavelength of the EDFs and the pump optical energy is distributed to each output fiber through the four input couplers 230–236. The pump reflectors are individually tunable to control which signals are allowed to propagate to the sixteen broadcast fibers. For example purposes, if channels A, B, C, and D are input to respective input fibers 1, 2, 3, and 4, then any combination of the channels A–D can be output on broadcast fibers 1–4. Broadcast fiber 1 can output channels A and B, broadcast fiber 2 can output channel C only, broadcast fiber 3 can output channels A and C, and broadcast fiber 4 can output channels A–D.

The broadcast switch 220 can be scaled to an N×N broadcast switch. A preferred scaling is as follows:

| ELEMENT | NUMBER OF ELEMENTS |
|---|---|
| 1 × N couplers | 2N |
| Tunable FBGs | $N^2$ |
| Pump sources | N/4 |
| 1 × N pump couplers | N/4 |

With regard to scaling, it has been shown by Charles Clos (Bell Systems Technical Journal, March 1953, pp. 406–424) that tradeoffs can be made between the number of elements and the requirements for blocking and non-blocking.

Figure 13:
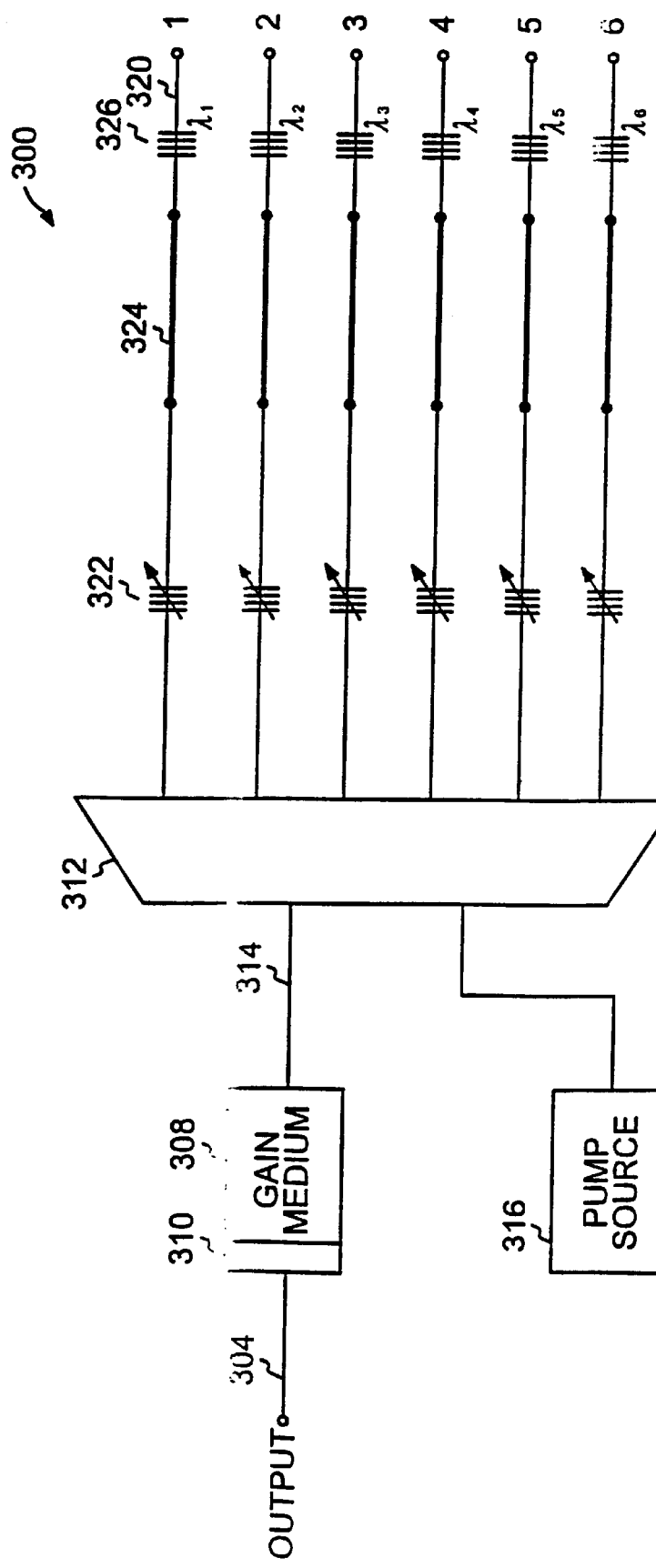
FIG. 13 is a wavelength adjustable laser utilizing optical switch devices in accordance with the invention.

FIG. 13 is a depiction of a preferred wavelength-adjustable laser 300 utilizing multiple optical switch devices. The wavelength-adjustable laser has an output fiber 304 that is connected to a gain medium 308. The gain medium has a partially reflective mirror 310 optically connected to the output fiber. The gain medium is connected to the input end of a 1×6 optical coupler 312 by an optical fiber 314. A pump source 316 is also connected to the input end of the 1×6 coupler.

The output end of the 1×6 coupler 312 is connected to six output fibers 320, with each output fiber having a wavelength-adjustable FBG as a pump reflector 322, an EDF 324 as a pump-dependent attenuator, and a fixed wavelength FBG as a signal reflector FBG 326. In the preferred embodiment, the six EDFs have the same pumping wavelength and the pump source 316 generates continuous pump energy at the pumping wavelength. The six pump reflector FBGs are individually adjustable over a wavelength range that includes the pumping wavelength of the EDFs. The six signal reflector FBGs are fixed-wavelength FBGs that reflect narrow, stable wavelength bands of optical energy ($\lambda_1$–$\lambda_6$). The wavelength bands reflected by the six signal FBGs correspond to the desired wavelengths of laser light to be output from the laser.

A laser cavity is created between the partially reflective mirror 310 and one of the signal reflector FBGs 326. The reflective wavelength of the FBG that creates the second mirror of the laser cavity dictates the wavelength of the laser that is generated. In operation, gain is provided to the system through the gain medium 308, which is typically an EDF. The FBG that creates the second mirror of the laser cavity is determined by the pump reflector FBG 322 and EDF 324 combinations. The pump reflector FBGs are individually tunable such that pump energy generated from the pump source 316 is either passed to the respective EDF or reflected away from the respective EDF. To create lasing in the laser cavity at a single wavelength, all but one of the pump reflectors are tuned to block the pump energy from contacting the EDFs. One of the pump reflectors is tuned to pass pump energy to the respective EDF. With pump energy at the pumping wavelength supplied to one EDF, the EDF passes, toward the signal reflector, the broadband gain that is generated by the gain medium. The signal reflector reflects back only the optical energy in the narrow wavelength band of the FBG. The signal reflector becomes the second mirror in the newly created laser cavity. When the system gain meets or exceeds the system losses, laser light can be emitted through the output fiber 304. It should be understood that the wavelength-selectable laser is described with reference to six output fibers including six signal reflectors, but could also be described with reference to N output fibers and N signal reflectors.

In an alternative embodiment of the switch 50 of FIG. 3, the EDF 56 of the switch may be turned into an out-of-band laser in order to lock the gain of the EDF at a particular wavelength. The laser cavity of the out-of-band laser can be created by placing out-of-band reflectors, such as FBGs, on either side of the EDF. Adding the out-of-band reflectors may reduce pump energy requirements in certain configurations. External laser energy may also be input into the EDF in order to maintain constant gain as signal transmission varies through the switch system.

In addition, or as an alternative to the out-of-band laser, a gain flattening element such as a long period grating may be used to compensate for fluctuating signal transmission characteristics. Gain flattening, or wavelength-dependent absorption, enables the switch to transmit multiple optical signals at approximately the same intensity.

What is claimed is:
1. An optical switch comprising:
    a signal path having an input waveguide and an output waveguide for guiding an optical signal;
    pump-dependent attenuator means, optically connected to said signal path for passing said optical signal from said input waveguide to said output waveguide in response to receiving optical energy at a pumping wavelength and for attenuating said optical signal in an absence of receiving said optical energy at said pumping wavelength;
    pump means for continuously generating optical energy for introduction to said signal path, said pump means having a condition in which optical energy is generated at said pumping wavelength; and
    pump-energy controller means for controlling one of a wavelength of optical energy generated by said pump means and transmission characteristics of a path from said pump means to said pump-dependent attenuator means, said transmission characteristics being specific to said optical energy at said pumping wavelength.
2. The switch of claim 1 wherein said pump-energy controller means is an optical energy director having a reflective section, said reflective section having a first state wherein optical energy at said pumping wavelength generated by said pump means is directed toward said pump-dependent attenuator means and having a second state wherein optical energy at said pumping wavelength generated by said pump means is directed away from said pump-dependent attenuator means.
3. The switch of claim 2 wherein said optical director is a tunable fiber Bragg grating that is tunable to block a narrow wavelength band that includes said pumping wavelength.
4. The switch of claim 3 wherein said pump means is a laser pump that is fixed in said condition in which optical energy is generated at said pumping wavelength.

5. The switch of claim 2 wherein said optical director is a bandpass filter that is tunable to pass a narrow wavelength band that includes said pumping wavelength.

6. The switch of claim 1 wherein said pump-energy controller means includes a fiber Bragg grating having an optical energy wavelength band of reflectivity.

7. The switch of claim 6 wherein said fiber Bragg grating is fixed with respect to said optical energy wavelength band of reflectivity and said pump-energy controller means is connected to adjust said wavelength of optical energy generated by said pump means.

8. The switch of claim 1 wherein said pump-dependent attenuator means is an erbium-doped fiber.

9. A method of controlling the transmission of optical signals input into an optical system having a wavelength-dependent optical attenuator that is optically connected to an input waveguide and an output waveguide comprising the steps of:
   selectively generating pump optical energy at a pumping wavelength;
   transmitting said pump optical energy toward said optical attenuator via a transmission path;
   selectively switching conditions along said transmission path between a first path condition for passing said pump optical energy to said optical attenuator and a second path condition for blocking said pump optical energy from said optical attenuator;
   passing an optical signal to said output waveguide of said optical system when said pump optical energy is passed to said optical attenuator via said transmission path; and
   attenuating said optical signal within said optical system when said pump optical energy is blocked from said optical attenuator.

10. The method of claim 9 wherein said step of selectively switching said conditions along said transmission path of said pump optical energy includes a substep of tuning a fiber Bragg grating that reflects optical energy at a target wavelength, said target wavelength being related to operation of said optical attenuator.

11. The method of claim 9 wherein said step of selectively switching said conditions along said transmission path of said pump optical energy includes a substep of tuning a bandpass filter that passes a target wavelength of optical energy, said target wavelength being related to operation of said optical attenuator.

12. An optical system for controlling optical signals comprising:
   a first input waveguide for guiding transmission of an optical signal;
   a first output waveguide, optically associated with said input waveguide, for guiding said transmission of said optical signal;
   an optical attenuator pump source, optically associated with said first output waveguide, having an output for continuously outputting optical energy; and
   a first individually controllable optical switch having:
      an optical attenuator optically connected to said optical attenuator pump source and located in a continuous optical path that includes said first input waveguide and said first output waveguide, said optical attenuator having a first condition in which said optical attenuator is in optical contact with optical energy at a pumping wavelength generated by said optical attenuator pump source such that said transmission of said optical signal is unattenuated by said optical attenuator, and having a second condition in which said optical attenuator is not in optical contact with optical energy at said pumping wavelength generated by said optical attenuator pump source such that said transmission of said optical energy is attenuated by said optical attenuator; and
      an optical attenuator pump source director, optically associated with said optical attenuator and said optical attenuator pump source, having a state in which optical energy output from said optical attenuator pump source is directed away from said optical attenuator.

13. The optical system of claim 12 wherein said optical attenuator pump source director is a tunable fiber Bragg grating having perturbations that reflect optical energy at said pumping wavelength while in said state.

14. The optical system of claim 12 wherein said optical attenuator is an erbium-doped fiber.

15. The optical system of claim 12 wherein said optical attenuator pump source director is a bandpass filter.

16. The system of claim 12 further comprising:
   an optical coupler optically connected to said first input waveguide and said first output waveguide;
   a second output waveguide optically connected to said optical coupler and said first input waveguide; and
   a second individually controllable optical switch, structurally equivalent to said first individually controllable optical switch, optically connected to said second output waveguide.

17. The system of claim 12 further comprising:
   a 1×N optical coupler optically connected to said first input waveguide and said first output waveguide;
   N−1 second output waveguides optically connected to said 1×N optical coupler; and
   N−1 second individually controllable optical switches which are structurally equivalent to said first optical switch, each of said N−1 second optical switches being optically connected on a one-to-one basis to said N−1 second output waveguides.

18. The system of claim 17 further comprising:
   a gain medium optically connected to said first input waveguide, said gain medium having a partially reflective mirror;
   a laser output waveguide optically connected to said partially reflective mirror of said gain medium; and
   N signal reflectors, connected in one-to-one correspondence to said first output waveguide and said N−1 second output waveguides, said N signal reflectors being connected such that said first optical switch and said N−1 second optical switches are located in optical paths between said optical attenuator pump source and said N signal reflectors.

19. The system of claim 12 further comprising:
   a first optical coupler optically connected between said first input waveguide and said first optical switch;
   a second optical coupler optically connected between said first optical switch and said first output waveguide;
   a second output waveguide optically connected to said first optical coupler;
   a second optical switch structurally equivalent to said first optical switch optically connected between said first optical coupler and said second optical coupler; and
   a first reflector, optically connected between said first optical coupler and said second optical coupler and on a same optical path as said first optical switch;

whereby said optical signal can be transmitted through said first output waveguide or said second output waveguide by activating one of said second optical switch or said first optical switch, respectively.

20. The system of claim 12 further comprising:

N input optical couplers, each having one input by N outputs with one output waveguide being optically connected to each of said N outputs, said output waveguides each being connected to a controllable optical switch that is structurally equivalent to said first optical switch, each of said N input optical couplers being optically connected to one of said optical attenuator pump source and an additional optical pump source;

N−1 additional input waveguides, said first input waveguide and said N−1 input waveguides being optically connected on a one-to-one basis to each one of said N input optical couplers by said one input;

N output optical couplers, each having N inputs by one output with N of said output waveguides, one from each of said N input optical couplers, being connected to each one of said N output optical couplers; and N broadcast waveguides, one connected to each output of said N output optical couplers;

whereby said optical system can selectively multi-cast, broadcast, and switch optical signals between said input waveguides and said broadcast waveguides.

\* \* \* \* \*